United States Patent [19]
Hirabayashi et al.

[11] Patent Number: 4,746,146
[45] Date of Patent: May 24, 1988

[54] VEHICLE CONSTRUCTION

[75] Inventors: Hirokazu Hirabayashi, Ebina City; Hajime Masagaki, Fujisawa City, both of Japan

[73] Assignee: Nissan Motor Co., Ltd., Yokohama City, Japan

[21] Appl. No.: 939,661

[22] Filed: Nov. 25, 1986

[30] Foreign Application Priority Data

Dec. 2, 1985 [JP] Japan .................. 60-271114

[51] Int. Cl.$^4$ .................................................. B62D 21/00
[52] U.S. Cl. ........................ 280/795; 280/701; 280/724; 296/35.1
[58] Field of Search ............... 280/781, 795, 701, 724; 296/35.1

[56] References Cited
FOREIGN PATENT DOCUMENTS
1431287 1/1966 France ..................... 280/124 R OTHER PUBLICATIONS
Service Manual, Mazda Car, pp. 13-33-13-35, Jan. 1985.
Service Manual, Nissan Car, p. E26, Dec. 1983.

Primary Examiner—Kenneth R. Rice
Attorney, Agent, or Firm—Pennie & Edmonds

[57] ABSTRACT

An automatic vehicle rear part construction configurated to prevent unpleasant booming noise from comming out within a vehicle passenger compartment. The construction consists of a rear suspension member located under and secured at its opposite end sections to a vehicle body rear part. Wheel supporting members with rear wheels are swingably connected to the rear suspension member. Additionally, a rigid connecting member is provided to connect the axially central portion of the rear suspension member and the vehicle body, thereby suppressing forward and rearward vibration of the rear suspension member.

17 Claims, 3 Drawing Sheets

VEHICLE CONSTRUCTION

BACKGROUND OF THE INVENTION

1. Field of the Invention

The present invention relates generally to an improvement in a vehicle construction, and more particularly to a supporting structure for a rear suspension member to which wheel supporting members are swingably connected, for the purpose of lowering noise level within a vehicle passenger compartment.

2. Description of the Prior Art

In connection with front-wheel drive automotive vehicles, it has been proposed and put into practical use to provide a rear suspension member forming part of a rear suspension system, located under a vehicle body rear part. The rear suspension member extends laterally and secured to the vehicle body. Rear wheels together with wheel supporting members are swingably connected to the rear suspension member and elastically connected through a strut including a shock absorber to the vehicle body. However, difficulties have been encountered in the automotive vehicles provided with such a rear suspension member, in which the resonance frequency of the rear suspension member usually tends to fall within a range of from 100 to 200 Hz, which resonance frequency is of vibration in the forward and rearward direction. Accordingly, the rear suspension member makes it resonance vibration upon receiving vibration having the same frequency as the resonance vibration from road surface, so that the vibration of the rear suspension member is amplified and transmitted to the inside of a vehicle passenger compartment. The thus transmitted vibration has freqency falling within the rangeof from 100 to 200 Hz, and comes out as so-called booming noise which passengers feel unpleasant.

SUMMARY OF THE INVENTION

A vehicle construction of the present invention consists of a rear suspension member to which rear wheels together with wheel supporting members are swingably connected. The rear suspension member is disposed under a vehicle body and extends laterally with respect to the vehicle body. The opposite end sections of the rear suspension member are secured to two oppositely disposed rear side members of the vehicle body, respectively. Additionally, a rigid connecting member is provided to connect the axially central portion of the rear suspension member and the vehicle body.

Accordingly, by virtue of the rigid connecting member, forward and rearward vibration of the rear suspension member is largely suppressed thereby to put the resonance frequency of the rear suspension member outside the frequency range of from 100 to 200 Hz. Therefore, the rear suspension member is prevented from resonance vibration even under vibration transmitted from road surface, thereby preventing unpleasant booming noise from coming out within the passenger compartment.

DETAILED DESCRIPTION OF THE INVENTION

Figure 1:
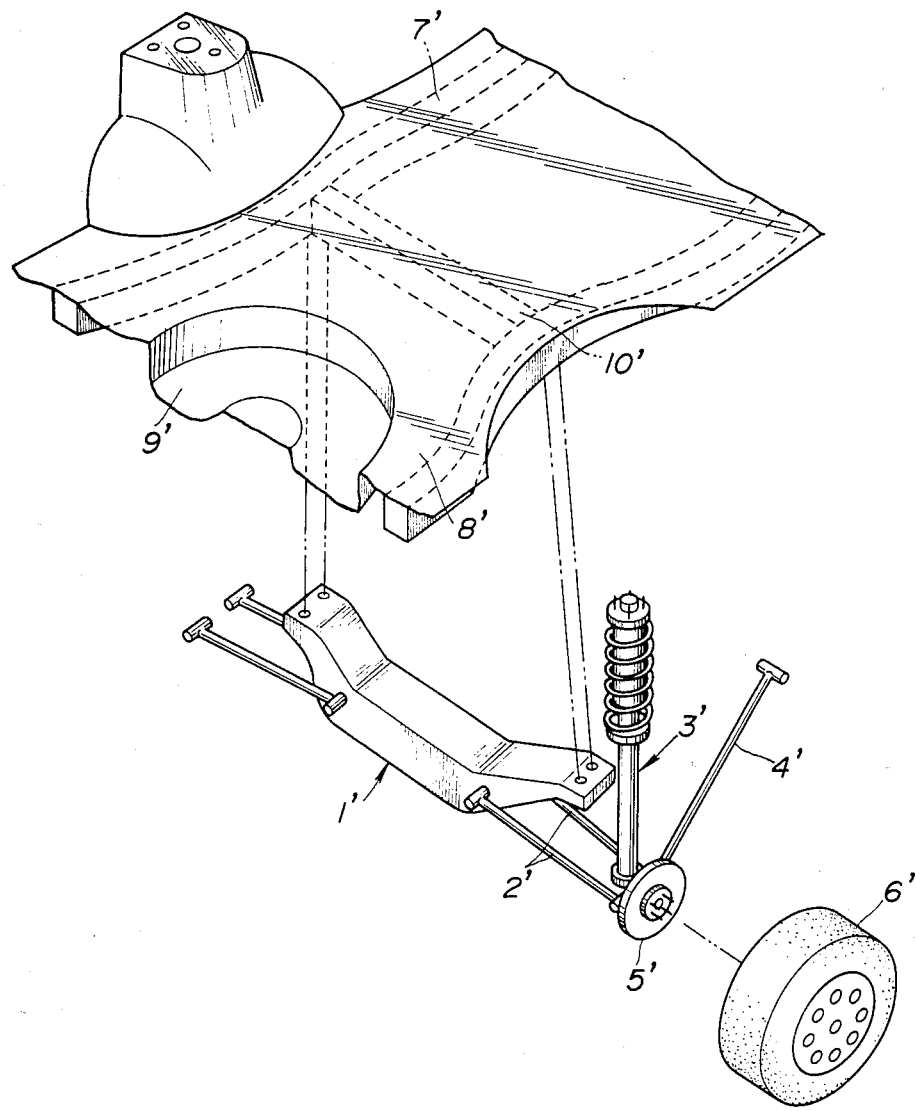
FIG. 1 is an exploded perspective view of a conventional vehicle rear part construction.

To facilitate understanding of the present invention, a brief reference will be made to a fragmentary conventional vehicle rear part construction, depicted in FIG. 1. Referring to FIG. 1, the conventional vehicle rear part construction is of a front-wheel drive type automotive vehicle and includes a rear suspension member 1' whose opposite end sections are respectively connected to oppositely disposed rear side members 7', 7' of a vehicle body. The rear side members 7', 7' are disposed below a floor panel member 8' of a rear part of the vehicle body. A cross member 10' is also disposed below the floor panel 8' to interconnect the rear side members 7', 7'.

A wheel supporting member 5 for rotatably supporting a rear wheel 6 is swingably connected at its front and rear parts with the rear suspension member 1' by lateral links 2', 2' so as to be swingable upward and downward. Additionally, the wheel supporting member 5' is elastically connected through a strut having a shock absorber with the vehicle body, and further connected to the rear side member 7' to be swingable upward and downward. The rear suspension member 1' is laterally elongated and is depressed at its central section to be generally bow-shaped. The opposite end sections of the rear suspension member 1' are bolted respectively to the side members 7', 7'. Accordingly, the installation positions of the lateral linkages 2', 2' can be lowered, thereby making possible to dispose fuel lines, an exhaust pipe and a fuel tank in a space formed above the rear suspension member or thereby making possible to employ a design in which the vehicle body floor panel member is lowered by a distance corresponding to the space.

Now, it is a well known fact that noise within a frequency range of from 100 to 200 Hz is found very unpleasant by a human inside a passenger compartment of an automotive vehicle, in which such a noise is perceived as so-called booming noise. Accordingly, it is an important theme in automotive noise and vibration control, to lower the noise level within the above frequency range. In other words, it is eagerly desired to suppress vibration within the frequency range of from 100 to 200 Hz as much as possible.

However, in such a conventional vehicle rear part construction, the rear suspension member 1' serves as a kind of a beam which is supported at its opposite ends (or two supported points) by the rear side members 7', 7', so that the distance between the two supported points is unavoidably restricted by the distance between the rear side members 7', 7'. Furthermore, the rear suspension member 1' is restricted in its shape and thickness from considerations of strength, weight and the like. As a result, there arises high possibility of the resonance frequency of the rear suspension member 1' in forward and rearward direction falling within a range of from 100 to 200 Hz. Here, during cruising of the vehicle with the such a conventional vehicle construction, vibration from the road surface is transmitted to the rear wheel 6 and input through the lateral links 2' to the rear suspension member 1'. This vibration serves as an excitation force that accordingly excites vibration of the rear suspension member 1' in forward and rearward direction. Moreover, the frequency of the vibration from the pad surface may approximate the resonant frequency of the rear suspension member 1'. Thus, vibration of the rear suspension member 1' is amplified and then transmitted to the inside of the passenger compartment. The frequency of vibration transmitted to the passenger compartment inside corresponds to the resonance frequency of the rear suspension member 1' and therefore falls within the range of from 100 to 200 Hz. As a result, booming noise or vibration is generated inside the passenger compartment, making the passenger unpleasant.

Figure 2:
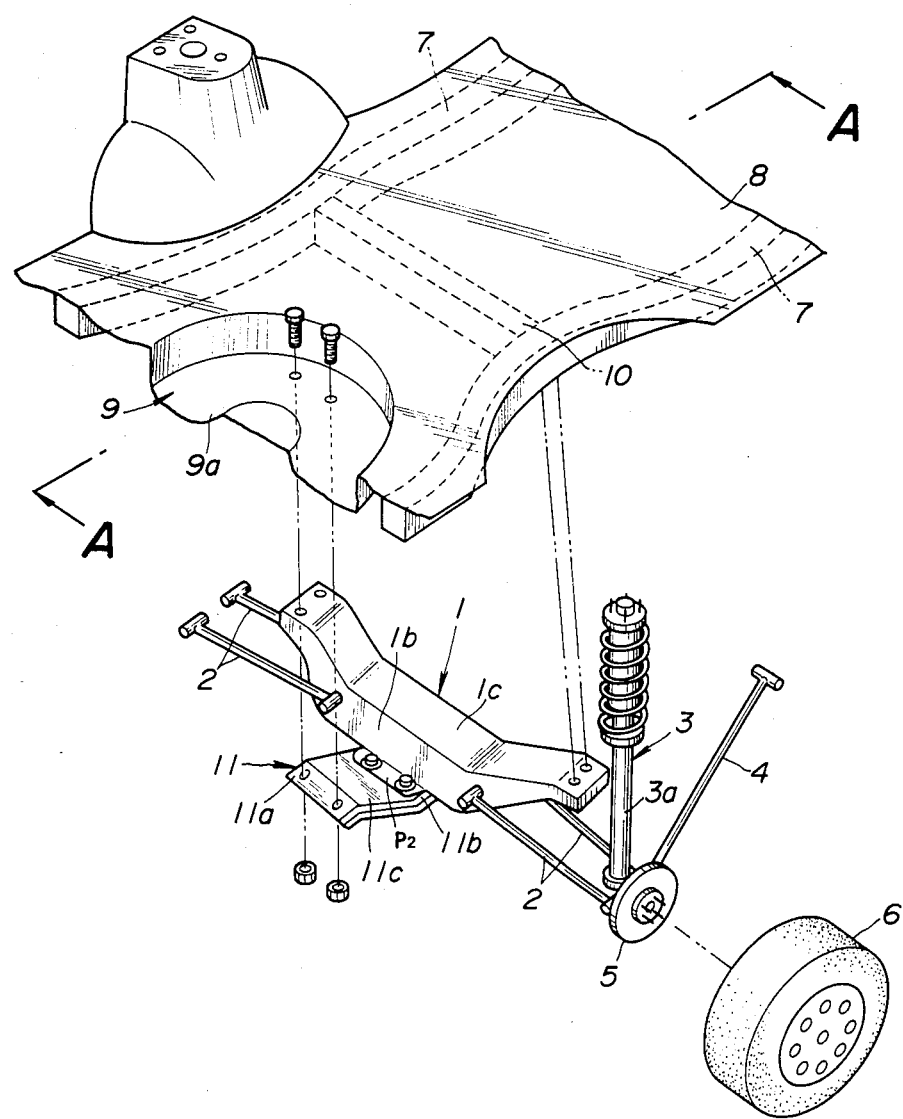
FIG. 2 is an exploded perspective view of a vehicle rear part construction.
Figure 3:
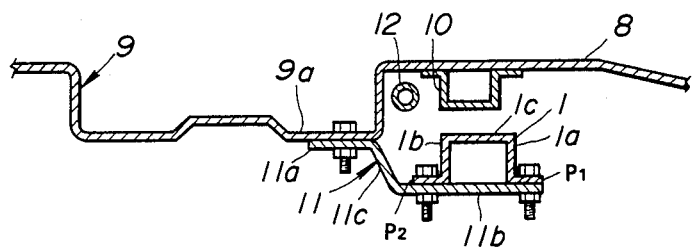
FIG. 3 is a cross-sectional view taken in the direction of arrows substantially along the line A—A of FIG. 2 in an assembled state.

Conventional vehicle rear part construction, FIGS. 2 and 3 show a preferred embodiment of a vehicle (rear part). The vehicle construction of this embodiment is of a front-wheel drive type automotive vehicle and comprises a rear suspension member 1 which is elongated laterally that is in a direction perpendicular to a vertical central plane (not shown) containing a longitudinal center line of a vehicle body. The rear suspension member 1 has opposite end sections which are respectively bolted to oppositely disposed rear side members 7, 7. The rear side members 7, 7 are fixedly disposed below a vehicle body floor panel member 8 of a rear part of the vehicle body. Additionally, a cross member 10 is also fixedly disposed below the floor panel member 8 in such a manner as to interconnect the rear side members 7, 7. The floor panel member 10 is formed with a spare tire house 9 in which a spare tire (not shown) is housed. The spare tire house 9 is located on the rear side of the cross member 10.

The rear suspension member 1 is generally channel-shaped and accordingly includes front and rear vertical side plate sections 1a, 1b which are generally parallel with each other and located forward and rearward in a direction of the vehicle body center line. The rear suspension member further includes a horizontal plate section 1c located to interconnect the side plate sections 1a, 1b. The rear suspension member 1 is formed depressed at its central section so that the horizontal plate section 1c has a central lower portion, and oppositely located two end upper portions which are bolted to the rear side members 7, 7, respectively, so that the rear suspension member 1 is generally bow-shaped as a whole. The front side plate 1a is formed at its lower edge portion with a flange-like projection $P_1$ which is located at an axially central part of the side plate section 1a and projects forwardly. Similarly, the rear side plate section 1b is formed at its lower edge portion with a flange-like projection $P_2$ which is located at an axially central part of the side plate section 1b and projects rearwardly. Each flange-like projection $P_1$, $P_2$ is generally horizontal or parallel with the horizontal plate section 1c. Each flange-like projection $P_1$, $P_2$ is formed with two through-holes or bolt-holes in which two bolts are respectively inserted. Thus, the rear suspension member 1 is generally symmetrical with respect to the vertical central plane containing the vehicle body longitudinal center line.

A stay or connecting member 11 is secured to the rear suspension member flange-like projections $P_1$, $P_2$ and extends rearwardly. More specifically, the stay 11 is bent along two separate and parallel lines so as to form upper and lower parallel horizontal sections 11a, 11b which are integrally connected through a central inclined section 11c. The lower section 11b elongates forward and is formed with front two and rear two through-holes or bolt-holes for bolts, in which the lower section 11b is bolted to the flange-like projections $P_1$, $P_2$ in such a manner that two bolts are inserted in the front two through-holes and the corresponding through-holes of the rear suspension member front flange-like projection $P_1$ while two further two bolts are inserted in the rear two through-holes and the corresponding through-holes of the rear suspension member rear flange-like projection $P_2$. The upper section 11a of the stay 11 is also formed with two through-holes for bolts and bolted to the bottom wall section 9a of the spare tire housing 9 which bottom wall section forms part of the floor panel member 8, in which two bolts are respectively inserted in the through-holes of the stay upper section 11a and the corresponding through-holes formed in the bottom wall section 9a of the spare tire housing 9.

A wheel supporting member 5 for rotatably supporting a rear wheel 6 is movably connected to the rear suspension member by two parallel lateral links 2, 2. More specifically, one of lateral links 2, 2 has one end section pivotally connected to a front side of the wheel supporting member 5 and the other end section pivotally connected to the rear suspension member front side plate section 1a, whereas the other lateral link 2 has one end section pivotally connected to a rear side of the wheel supporting member 5 and the other end section pivotally connected to the rear suspension rear side plate section 1b. The wheel supporting member 5 is connected to the vehicle body forward of the rear suspension member 1 by a radial link 4, in which the radial link 4 has one end section pivotally connected to the wheel supporting member 5 and the other end section pivotally connected to the vehicle body. Furthermore, the wheel supporting member 5 is movably connected through a strut 3 to the vehicle body, the strut 3 including a shock absorber 3a. Accordingly, the wheel supporting member 5 is swingable upwardly and downwardly relative to the vehicle body. It will be understood that the other wheel supporting member for supporting the other rear wheel is located on the opposite side of the vertical plane containing the vehicle body longitudinal center line from the wheel supporting member 5 though not shown, in which the above-mentioned other wheel supporting member is also swingably connected to the rear suspension member 1 through the lateral links 2, 2 to the vehicle body through a strut 3 and a radial link 4.

Figure 4:
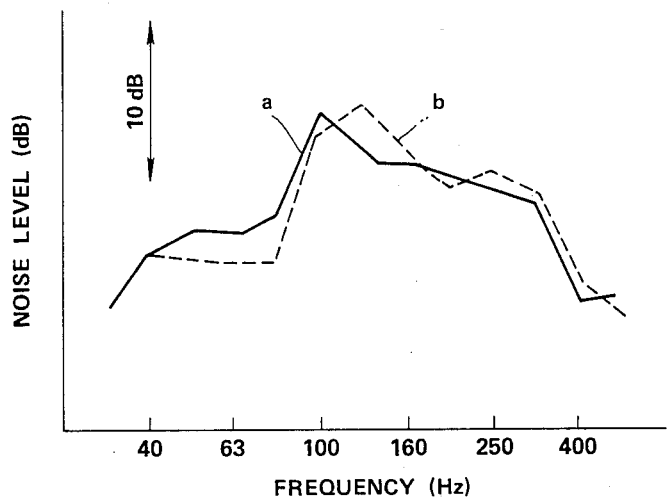
FIG. 4 is a graph showing noise reduction effect of the vehicle construction of FIGS. 2 and 3 in comparison with the conventional construction of FIG. 1.

With the thus arranged vehicle rear part construction, by virtue of the stay 11 rigidly connecting the rear suspension member 1 to the vehicle body, vibration of the rear suspension member 1 in the forward and rearward direction is effectively suppressed so that the resonance frequency of a vibration system around the rear suspension member 1 is raised as compared with that in the conventional vehicle rear part construction as shown in FIG. 1. Consequently, the resonance frequency of the vibration system does not exist within a range of from 100 to 200 Hz, thereby lowering the vibration level of vibration within the frequency range of from 100 to 200 Hz input from road surface. As a result, noise or vibration within this frequency range can be effectively suppressed in the passenger compartment, thus improving silence of the passenger compartment. This will be apparent from the graph of FIG. 4 showing comparison in noise level at a front seat within a passenger compartment between a case of an automotive vehicle having the rear part construction of FIGS. 2 and 3 and an another case of an automotive vehicle having the conventional rear part construction as shown in FIG. 1. In the graph of FIG. 4, a curve a represents the noise level of the former case in connection with the vehicle construction of FIGS. 2 and 3, whereas a curve b represents the noise level in the letter case in connection with the conventional vehicle construction of FIG. 1. This graph demonstrates that the noise level within the passenger compartment in the case of the present invention was considerably lowered within the frequency range of from 100 to 200 Hz as compared with the conventional case.

In addition, the stay 11 shown in FIGS. 2 and 3 functions to protect a fuel line 12 in an automotive vehicle of the type wherein the fuel tube 12 is positioned in a space located forward of the spare tire house 9 as shown in FIG. 3. In other words, in the event that a vehicle having the conventional construction of FIG. 1 is struck at its rear-most section by another vehicle, the spare tire housing 9' deforms forward to interfere with a fuel line corresponding to line (12). However, in case of the vehicle construction of FIGS. 2 and 3, the strength of the spare tire housing 9 is reinforced by stay 11 to increase its strength, thereby reducing the possibility of interference of the spare tire housing 9 with the fuel tube 12. This the reduces danger of fuel leakage leading to vehicle fire.

While the stay 11 has been shown and described as connecting the rear suspension member 1 and the spare tire housing 9 positioned rearward of the rear suspension member 1, it will be understood that the stay may be disposed to connect the rear suspension member 1 and the cross member 10 positioned over the rear suspension member 1 or to the floor panel member 8 located forward of the rear suspension member thereby to offer the same noise level lowering effect as in the embodiment of FIGS. 2 and 3. In addition, although the stay 11 has been shown and described as formed separate from the rear suspension member 1, it will be understood that the stay 11 will more commonly be formed integral with the rear suspension member 1 to provide a connecting section through which the rear suspension member 1 is rigidly connected to the vehicle body.

What is claimed is:

1. A vehicle construction comprising:
    a vehicle body having first and second rear side members which are oppositely disposed and spaced from each other;
    a rear suspension member disposed under said vehicle body and extending laterally with respect to said vehicle body, said rear suspension member being formed to comprise first and second end portions which are respectively secured to said first and second rear side members, and a central portion located between and formed integrally with said first and second end portions;
    a wheel supporting member for rotatably supporting a rear wheel;
    first link members for movably connecting said rear suspension member and said wheel supporting member so that said wheel supporting member is vertically swingable; and
    a rigid connecting member for rigidly connecting said rear suspension member central portion and said vehicle body.

2. A vehicle construction as claimed in claim 1, wherein said vehicle body includes a floor panel member disposed above said first and second rear side members, wherein said rigid member connects said rear suspension member central section and said vehicle body floor panel member.

3. A vehicle construction as claimed in claim 1, further comprising a second link member for movably connecting said wheel supporting member and said vehicle body.

4. A vehicle construction as claimed in claim 1, further comprising a strut for elastically connecting said wheel supporting member to said vehicle body, said strut including a shock absorber.

5. A vehicle construction as claimed in claim 1, wherein said rigid connecting member extends generally perpendicular to the length of said rear suspension member.

6. A vehicle construction as claimed in claim 2, wherein said rear suspension member is depressed at the central portion thereof so that the central portion is spaced from said vehicle body floor panel member.

7. A vehicle construction as claimed in claim 2, wherein said rear suspension member is generally channel-shaped and includes first and second vertical side plate sections which are spaced from each other and located in forward and rearward relationship relative to said vehicle body, and a horizontal plate section connecting said first and second vertical side plate sections.

8. A vehicle construction as claimed in claim 7, wherein said rigid connecting member includes a first end section secured to said rear suspension member first and second vertical side plate sections, and a second end section secured to said vehicle body floor panel member.

9. A vehicle construction as claimed in claim 8, wherein each of said first and second vertical side plate sections is formed at its axially central part with a flange-like projection to which said rigid connecting member first end section is secured.

10. A vehicle construction as claimed in claim 8, wherein said vehicle body floor panel member is formed with a depression in which a spare tire is to be housed, a bottom part of the depression being defined by a bottom wall section forming part of said floor panel member, wherein said rigid member second end section is secured to said bottom wall section of said floor panel member.

11. A vehicle construction as claimed in claim 9, further comprising a first plurality of bolts for fastening said flange-like projection of said rear suspension member second vertical side plate section to said rigid connecting member first end section, and a second plurality of bolts for fastening said second end section of said rigid member to said vehicle body floor panel member.

12. A vehicle construction as claimed in claim 2, further comprising a cross member disposed below said floor panel member and rigidly connecting said first and second rear side members.

13. A vehicle construction as claimed in claim 12, said cross member extends parallel to the length of said rear suspension member.

14. A vehicle construction as claimed in claim 10, further comprising a fuel line disposed forward of a part of said floor panel member defining said depression and located in a space between said floor panel and said rigid connecting member.

15. A vehicle construction as claimed in claim 1, wherein a vibration system including said rear suspension member a resonance frequency outside a range of from 100 to 200 Hz in vibration in a forward and rearward direction of said vehicle body.

16. A vehicle construction as claimed in claim 1, wherein said vehicle body is of an automotive vehicle of front-drive type.

17. A vehicle construction comprising:
- a vehicle body having first and second rear side members which are oppositely disposed and spaced from each other;
- a rear suspension member disposed under said vehicle body and extending laterally with respect to said vehicle body, said rear suspension member having first and second end portions which are respectively directly secured to said first and second rear side members, and a central portion located between and separate from said first and second end sections;
- a wheel supporting member for rotatably supporting a rear wheel;
- first link members for movably connecting said rear suspension member and said wheel supporting member so that said wheel supporting member is vertically swingable; and
- a rigid connecting member for connecting said rear suspension member central portion and said vehicle body, said rigid connecting member having a first end portion directly and fixedly secured to said rear suspension member central portion, and a second end portion directly and fixedly secured to said vehicle body.

* * * * *